July 1, 1958 N. D. COGGESHALL 2,841,005
CHROMATOGRAPHIC METHOD AND APPARATUS
Filed Dec. 11, 1956

INVENTOR.
NORMAN D. COGGESHALL
BY
HIS ATTORNEY

United States Patent Office 2,841,005
Patented July 1, 1958

2,841,005

CHROMATOGRAPHIC METHOD AND APPARATUS

Norman D. Coggeshall, Verona, Pa., assignor to Gulf Oil Corporation, Pittsburgh, Pa., a corporation of Pennsylvania Application December 11, 1956, Serial No. 627,598

4 Claims. (Cl. 73—23)

This invention relates to a method and apparatus for separating fluid mixtures and more particularly to an improved partition chromatography method and apparatus adapted for high temperature analytical separations.

Partition chromatography has been widely used for the separation and analysis of fluid mixtures. Its principles have been described in the literature, for example, in the article by D. H. Lichtenfels et al., Analytical Chemistry, volume 27, number 10, October 1955, pages 1510–13. The article describes the analytical separation of a fluid mixture by gas-liquid partition chromatography. A small sample of a mixture to be separated and analyzed is injected into the end of a long, narrow column packed with inert, granular solid particles on which have been deposited a thin film or coating of a non-volatile solvent. The solvent is usually a high-boiling organic liquid and is referred to as a partitioning liquid. The column is eluted with an inert carrier gas such as helium. Components of the volatile mixture partition between a moving gas phase in the vapor space between the solid particles and a stationary liquid phase absorbed in the liquid coating of the granular particles. This causes the components of the mixture to move through the partitioning media within the column at individual velocities less than that of the carrier gas. The velocity at which each component moves is dependent on its partition coefficient, the latter being a measure of the solubility of the component in the stationary liquid phase. Since different compounds have different partition coefficients, the components of the mixture move through the column at different speeds and, if the column is long enough, they emerge one by one from the column usually in the order of boiling points for homologous series of compounds. The emerging components are detected by suitable means for detecting vapor concentrations in a gas stream. The most commonly used detecting means is a thermal conductivity cell connected with a recording potentiometer. The plot of potentiometer deflection against time provides a quantitative and qualitative analysis of the mixture.

I have referred to the liquid coating on the solid particles of the partition column as being "a non-volatile solvent" and as forming a "stationary" liquid phase. The partitioning liquid is commonly referred to in this way. However, as a matter of fact, none of the available partitioning liquids are completely stationary. During partition chromatography separations carried out at room temperature or at only slightly elevated temperatures the partitioning liquid is stationary for all practical purposes. But, even at low temperature the liquid has at least a slight tendency to flow. The flow is induced by gravity and by the drag of the moving carrier gas. When a gas-liquid partition chromatography column is operated at high temperatures, for example, above 100° C., the liquid coating on the granular material shows a marked tendency to migrate. This is due to the decreased viscosity at higher temperatures of the organic liquids commonly used as partitioning liquids. Movement of the partitioning liquid can have serious disadvantages. It may cause troublesome accumulation of the liquid in the low parts of the partition column and near the exit. The permeability of the column then differs at various points in the column and the volume of stationary liquid per unit length of column is no longer uniform throughout the column. As a result, the interpretation of the recorded plots of thermal conductivity cell responses to the effluent from the column becomes difficult. The reproducibility of measurements is destroyed and it is difficult to compare one run with another. The present invention provides a partition chromatography method and apparatus by means of which these disadvantages of the flow of the partitioning liquid can be reduced or eliminated.

The apparatus of the invention in general comprises a tubular partition column packed with solid particles having a surface coating of a partitioning liquid. The ends of the column are rigidly mounted on one face of a rotatable head and communicate respectively with two channels which extend through the head to an opposite face. On its opposite face the head is rotatably mounted on a stationary charge inlet block. This block has passing through it a carrier fluid channel and an effluent channel. The openings of these channels on the surface of contact between the stationary block and the rotatable head are so positioned that when the carrier fluid channel communicates with either one of the channels in the rotatable head the effluent channel communicates with the other channel in the rotatable head. A carrier fluid line connects the other end of the carrier fluid channel with a source of carrier fluid and an effluent line connects the other end of the effluent channel with a detecting means. The stationary block is also provided with means for injecting charge mixture into the carrier fluid channel.

The method of the invention in general comprises flowing a carrier fluid through the elongated partition column packed with solid particles having a surface coating of a partitioning liquid, injecting a fluid mixture to be analyzed into the stream of carrier fluid, recovering the effluent from the column at an exit point which is positioned preferably in the vicinity of the inlet point and detecting components of the charge mixture in the effluent. Subsequently, this procedure is repeated in additional cycles of introduction of charge mixture and analysis of effluent. At least once between cycles, the partition column is rotated to place the inlet end of the column for the previous cycle in the position of the outlet end of the column for the previous cycle and carrier fluid is flowed into the end of the column which was the exit end for the previous cycle.

The method and apparatus of the invention will be described in more detail by referring to the drawing of which:

Figure 1:
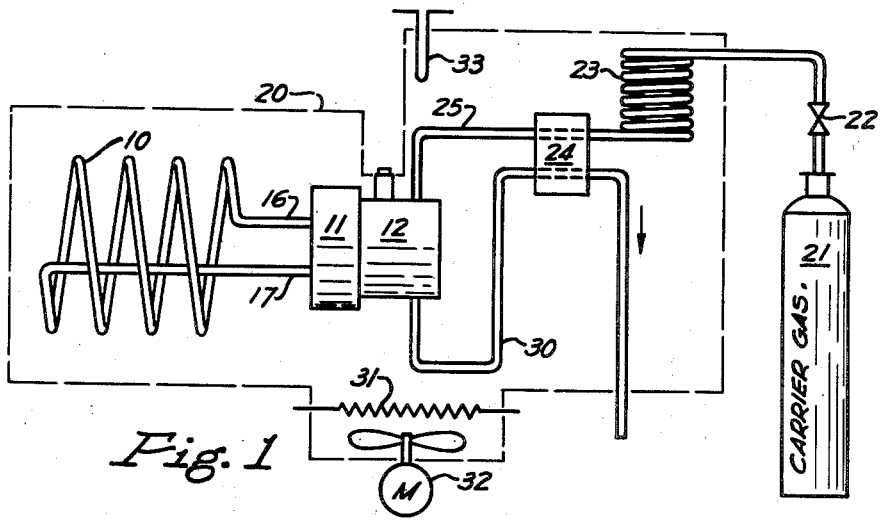
Figure 1 is a schematic diagram of one embodiment of the partition chromotography apparatus of the invention.

In the embodiment of my apparatus shown schematically in Figure 1 the partition column is a long narrow tube 10 in the form of a coil or helix which is packed with an inert, granular material such as granular kieselguhr of 20–100 mesh particle size. The solid particles have a surface coating of a non-volatile solvent such as dioctyl phthalate.

Figure 2:
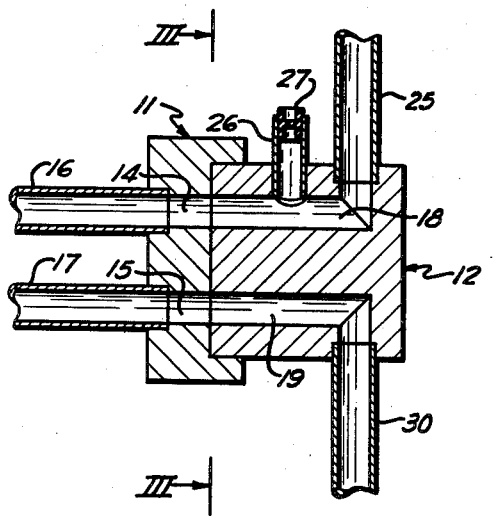
Figure 2 is an enlarged sectional view of the charge inlet region of the apparatus of Figure 1.
Figure 3:
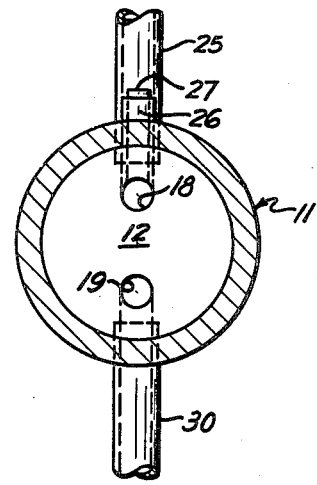
Figure 3 is a sectional view along line III—III of Figure 2.

In the preferred embodiment of my apparatus the two horizontal ends of column 10 are positioned relatively close together. They are spaced apart a short distance relative to the length of the column and are rigidly mounted in a rotatable head member 11. The head 11 is rotatably mounted on a circular face of a stationary charge inlet block 12. This is shown more clearly in Figures 2 and 3.

As they show, channels 14 and 15, which are generally parallel, pass through the rotatable head 11. The end 16 of column 10 is rigidly mounted in channel 14 and the end 17 is rigidly mounted in channel 15 so that the channels, in effect, are extensions of the column. The block 12 has a carrier gas channel 18 and an effluent channel 19. The openings of these channels in the circular face of the stationary block, which forms the surface of contact of the block with the rotatable head, are so positioned that when the carrier gas channel communicates with either one of the channels in the rotatable head the effluent channel communicates with the other channel in the rotatable head. A carrier gas line 25 communicates with carrier gas channel 18. An effluent line 30 communicates with channel 19 and connects channel 19 with a detecting means. For example, as shown in Figure 1, line 30 passes the effluent gas from the partition column through the testing channel of the thermal conductivity cell 24 and then to the atmosphere or to suitable collecting means.

Stationary block 12 is also provided with means for injecting the fluid charge mixture into the carrier gas channel. In the apparatus of the drawing this takes the form of a short tube 26 having at its upper end a puncturable, self-sealing rubber cap, similar to the self-sealing caps used on serum bottles, and communicating at its lower end with the carrier gas channel 18.

In the apparatus of Figure 1 the carrier gas source is the gas cylinder 21. Carrier gas passes from cylinder 21 through a pressure or flow control valve 22, through the reference channel of the thermal conductivity cell 24 and then via line 25 into the carrier gas channel 18 of the stationary block 12. The carrier gas then flows either into end 16 or end 17 of column 10 depending upon which end is aligned with channel 18 for that particular cycle.

As I have mentioned, the apparatus of the invention is particularly suited for separations carried out under conditions at which the viscosity of the partitioning liquid is low enough to cause it to flow excessively. When certain low-viscosity partitioning liquids are used, this problem may occur even at low temperature. Normally, however, in partition chromatography the partitioning liquid is a high-boiling, viscous liquid and the problem of flow of the partitioning liquid is encountered when it is desired to use high temperature for the separation or analysis. Accordingly, the apparatus of the invention would normally include suitable means for providing and maintaining elevated temperatures. For example, means can be provided for preheating the carrier gas and for maintaining the partition column at elevated temperature. Thus, as shown schematically in Figure 1, the apparatus can be provided with a constant temperature air bath which encloses the partition column and the thermal conductivity cell and is adapted to maintain these elements at a desired elevated temperature. The air bath includes an insulated enclosure 20, a heating means such as an electrical resistance heater 31, a blower 32, and a thermostat 33 to control the heater. In the apparatus of the drawing, the means for preheating the carrier gas is the preheater coil 23. This is simply a coiled portion of the carrier gas line 25 through which the carrier gas passes before passing to the reference channel of the thermal conductivity cell. The coil 23 is maintained at the desired elevated temperature by being enclosed within the heated air bath 20. Optionally, the column and the thermal conductivity cell can have individual air baths maintained at the same or different temperatures. These various possible temperature control means are shown only in a highly schematic way in the drawing because their structure and employment is well known and because considerable variations in their structure is possible.

I will describe the method of the invention, as carried out with the apparatus of the drawing, by describing a particular analytical separation for which high temperature is used, namely, the analysis of a crude isooctyl aldehyde for impurities. The use of carrier gas temperatures above 100° C. is advantageous or necessary in analyzing this mixture by gas-liquid partition chromatography because of the low vapor pressures of its components.

A 0.05 ml. sample of the liquid is drawn into a microsyringe. The needle of the syringe is inserted through the self-sealing rubber cap 27 and the charge mixture is injected through tube 26 into carrier gas channel 18. Carrier gas preheated to a temperature of 125° C. sweeps the charge mixture through channels 18 and 14 into column 10. This column is in the form of a coiled tube of 3/16 inch inside diameter and is packed with a crushed fire brick (specifically), a material known commercially as Johns-Manville Corp., Insulated Firebrick Sil-O-Cel, $C_{22}$) of 40–80 mesh particle size coated with ethyl-hexyl sebacate. The column is also maintained at the temperature of 125° C. The carrier gas successively elutes the components of the mixture from column 10 through channel 15 of the head member, through channel 19 of the block, through line 30 and through the testing channel of the thermal conductivity cell 24. The thermal conductivity cell with its recording potentiometer, not shown in the drawing, provides an analysis of the mixture. When all components of the charge mixture have been eluted from the column the apparatus is ready for the injection of another charge mixture in another analytical cycle.

At the temperature of 125° C. the viscosity of the ethyl-hexyl sebacate coated on the solid particles in column 10 is lowered so much that the liquid shows a tendency to flow to lower parts of column 10 and toward the exit end 17 of the column. Therefore, after each cycle or after several cycles of operation at this elevated temperature the head 11 is rotated 180° on a horizontal axis lying between ends 16 and 17 and on the same plane therewith to align end 16 of column 10 with effluent channel 19 and align end 17 of column 10 with carrier gas channel 18. When the carrier gas flow is resumed in the next cycle the direction of flow in column 10 is opposite to the direction of flow in the previous cycle. Thus, the tendency of flow of the partitioning liquid toward the exit of column 10 is reversed. Furthermore, the 180° rotation of column 10 on a horizontal axis inverts the column and changes the direction of the gravitational force with respect to the liquid coating on the solid particles within the column. Accordingly, the flow of partitioning liquid induced by gravity is reversed. After head 11 is rotated 180° and is locked in position, it provides a gas tight communication between channels 14 and 19 and channels 15 and 18. The flow of carrier gas is resumed and another fluid mixture sample to be analyzed is injected into the charge inlet cap 27.

Column 10 as shown in the drawing is essentially U-shaped and its intermediate portion is in the form of a coil. The coil form is advantageous because of its compactness and because it can be rotated easily on a horizontal axis. Other arrangements having these same advantages can also be used. Whatever the form of column, it is normally preferred that its two ends be close together, or in other words, spaced apart only a short distance relative to the length of the column. This contributes to the compactness of the apparatus and makes it possible for both ends to be mounted in a rotatable head which is conveniently small and yet provides communication for the ends of the column with both the carrier gas line and the effluent line.

The structure of the rotatable head and the stationary block can also, within the scope of the invention, differ from that shown in the drawing. An essential feature is that the openings of the channels in the rotatable head and in the stationary block should be positioned on the surfaces of contact between the head and the block in such a way as to provide communication between one of the channels in the head and one of the channels in the block when the other channel in the head and in the block are in communication. An example of another form of head and block structure which meet these requirements is found in an apparatus comprising an annular rotatable head member mounted on a cylindrical block and having the column ends mounted 180 degrees apart on the outer circumference of the annular rotatable head. In this apparatus the surface of contact between the block and head is a cylindrical surface rather than a circular face as in the embodiment shown in the drawing.

In the specification and claims when I refer broadly to the rotation of the column I mean to include rotation on a horizontal, vertical or inclined axis. In the form of the column shown in Figure 1 wherein the column is essentially U-shaped the rotation of the column on a horizontal axis inverts the column and thus changes the direction of the gravitational force. It also reverses the direction of the carrier gas flow. In preferred embodiments of the apparatus and method both of these effects are obtained. However, it should be understood that the principles of the invention include rotation of the column to obtain either one of the effects alone. Thus, for example, certain forms of the column can be rotated in such a manner as to invert the column and thus change the direction of the gravitational effect without reversing the direction of carrier gas flow. This inversion of the column will always occur when the column is rotated on a horizontal axis. The rotation of certain forms of the column on a vertical axis will cause reversal of the direction of carrier gas flow but will not change the gravitational effect. The rotation of the column on an inclined axis will cause some change in the gravitational effect and, with certain forms of the column, will change the direction of carrier gas flow. It should be understood, therefore, that the rotation of the column, as used in the broadest sense in the specifications and claims, means (1) a rotation that merely inverts the column to change the gravitational effect or (2) a rotation that merely reverses the direction of flow of carrier gas without inverting the column, or (3) a rotation that both inverts the column and reverses the direction of flow of carrier gas. The latter result is obtained in the preferred embodiments of the apparatus such as the apparatus shown in Figure 1 of the drawing.

In the example above I have described one particular separation in accordance with the invention. It should be understood, however, that the principles of the invention can be applied to the separation or analysis of many types of fluid mixtures, including petroleum naphthas and heavier hydrocarbon fractions. Normally, any of the carrier fluids, partitioning liquids and solids materials that are suitable for partition chromatography can be employed. For example, although I have described separation of a high-boiling liquid mixture for which high temperature separation is advisable, the method and apparatus of the invention will have advantages whenever the possibility of flow of the partitioning liquid is a problem. This problem may occur, depending on the viscosity of the partitioning liquid, at either low or high temperatures and in the separation of either a liquid or gaseous fluid mixture. Therefore, the method of the invention can be applied to the separation of such high-boiling liquid mixtures as described or to the separation of more volatile liquids or to the separation of gases.

The partitioning liquid for coating the solid particles in the process and apparatus of the invention can be selected from the many solvents that are suitable for use in partition chromatography. The partitioning liquid is applied as a surface coating to the granular solid material in the partitioning column. Suitable liquids include high-boiling organic solvents such as dioctyl phthalate, dinonyl phthalate, dioctyl sebacate, paraffin wax, silicone fluids, etc., but, as I have mentioned, the method and apparatus of the invention are particularly advantageous when a partitioning liquid of low viscosity is used. It is also possible to use volatile partitioning liquids (for example, water) if any such liquids have desirable solvent properties. When using a volatile partitioning liquid the carrier gas should be saturated with vapor of the partitioning liquid so that the liquid will not be removed by evaporation.

I have mentioned granular kieselguhr as a suitable solid material. As a general rule, any of the granular solid materials used for partition chromatography can be used. Preferably the solid particles are non-porous materials which are not chromatographically active adsorbents, as otherwise the effects of adsorption chromatography and partition chromatography may be superimposed upon each other and this might prevent the obtaining of sharply defined fractions.

I have described the use of a gas as the carrier fluid for the process of the invention, in which case the process is a gas-liquid partition chromatography process. Any inert gases that can be separated readily from the components of the charge mixture can be used. Examples of suitable carrier gases include hydrogen, nitrogen, helium, etc. The principles of the invention also extend to the use of a liquid as the carrier fluid, in which event the process is a liquid-liquid partition chromatography process and separation occurs as components of the charge mixture partition between the stationary liquid phase on the solid particles and the moving liquid phase formed by the carrier fluid. In such a process the carrier liquid should be substantially immiscible with the stationary partitioning liquid.

I have described a thermal conductivity cell with a recording potentiometer as a preferred means for analyzing the effluent from the partition chromatography column. However, other known detecting means with high sensitivity can be used in the process and apparatus of the invention.

Obviously many modifications and variations of the invention as hereinbefore set forth may be made without departing from the spirit and scope thereof and therefore only such limitations should be imposed as are indicated in the appended claims.

I claim:

1. A partition chromatography apparatus which comprises an elongated tubular partition column containing a partitioning media, the two ends of said column being rigidly mounted on a rotatable head, said rotatable head having two channels passing therethrough which communicate respectively with the two ends of said column, said rotatable head being rotatably mounted on a stationary charge inlet block, said block having a carrier fluid channel and an effluent channel passing therethrough, the openings of such channels on the surface of contact of said block with said rotatable head being so positioned that when the carrier fluid channel communicates with either of the channels in the rotatable head the effluent channel communicates with the other channel in the rotatable head, a carrier fluid line connecting the carrier fluid channel with a source of carrier fluid, an effluent line connecting the effluent channel with a detecting means and means for introducing a fluid charge mixture into the carrier fluid channel.

2. A partition chromatography apparatus adapted for high temperature use which comprises an elongated tubular partition column, the two ends of said column being spaced apart a short distance relative to the length of the column and rigidly mounted on a rotatable head, said rotatable head having two channels passing therethrough which communicate respectively with the two ends of said column, said rotatable head being rotatably mounted on a stationary charge inlet block, said block having a carrier gas channel and an effluent channel passing therethrough, said channels having openings on the surface of contact of said block with said rotatable head, such openings being so positioned that when the carrier gas channel communicates with either of the channels in the rotatable head the effluent channel communicates with the other channel in the rotatable head, a carrier gas line connecting the carrier gas channel with a source of carrier gas, a thermal conductivity cell having a reference channel and a testing channel, said reference channel communicating with said carrier gas line between said carrier gas source and said partition column, an effluent line connecting the effluent channel with the testing channel of said thermal conductivity cell, means in said stationary block for injecting a fluid charge mixture into the carrier gas channel and means for maintaining said partition column at an elevated temperature.

3. A method for separating a fluid mixture by partition chromatography under conditions such that the partitioning liquid tends to flow, which comprises flowing a carrier fluid at elevated temperature through an elongated partition column packed with solid particles having a surface coating of a flowable partitioning liquid, injecting a fluid mixture to be analyzed into the stream of carrier fluid, recovering the effluent from the exit end of the column, detecting components of the charge mixture in the effluent, subsequently repeating this procedure in additional cycles of introduction of charge mixture and recovery of effluent, at least once and between said cycles rotating the partition column to place the inlet end of the column for the previous cycle in the position of the exit end of the column for the previous cycle, flowing carrier fluid into the end of the column which was the exit end for the previous cycle and injecting a fluid mixture to be separated into the stream of carrier fluid.

4. A method for separating a fluid mixture by partition chromatography, under conditions such that the partitioning liquid tends to flow which comprises, flowing a carrier gas at a temperature at least about 100° C. through an elongated partition column packed with solid particles having a surface coating of a flowable partitioning liquid, injecting a fluid mixture to be analyzed into the stream of carrier gas, recovering the effluent from the column at an exit end of the column in the vicinity of the inlet end thereof, detecting components of the charge mixture in the effluent, subsequently repeating this procedure in additional cycles of introduction of charge mixture and recovery of effluent, at least once and between cycles rotating the partition column 180 degrees on a horizontal axis to invert said column and to place the inlet end of the column for the previous cycle in the position of the exit end of the column for the previous cycle, flowing carrier gas into the end of the column which was the exit end for the previous cycle and injecting a fluid mixture to be separated into the stream of carrier gas.

References Cited in the file of this patent

UNITED STATES PATENTS 2,757,541    Watson et al. _____ Aug. 7, 1956

OTHER REFERENCES

"Gas-Liquid Partition Chromatography," by D. H. Lichtenfels et al., Analytical Chemistry, volume 27, number 10, October 1955, pages 1510–13.